United States Patent [19]

Helmus et al.

[11] 4,333,750
[45] Jun. 8, 1982

[54] FILTRATION MODULE WITH INCLUDED ILLUMINATION

[76] Inventors: Martin C. Helmus, 2525 Knollview, SW., Wyoming, Mich. 49509; Wallace L. Baker, 4505 Hersman, SE., Grand Rapids, Mich. 49506

[21] Appl. No.: 236,437

[22] Filed: Feb. 20, 1981

[51] Int. Cl.³ .............................................. B01D 50/00
[52] U.S. Cl. ..................................... 55/259; 55/385 A; 55/473; 55/484; 55/502; 55/414; 55/480; 98/40 D; 98/40 DL; 98/41 AV
[58] Field of Search ..................... 55/385 A, 473, 484, 55/414, 480, 502, DIG. 29, 259; 98/40 D, 40 DL, 41 R, 41 AV, 115 LH

[56] References Cited

U.S. PATENT DOCUMENTS

| Re. 24,637 | 4/1959 | Wulle | 98/40 D |
|---|---|---|---|
| 2,845,855 | 8/1958 | Burns | 98/40 DL |
| 3,715,578 | 2/1973 | Wood et al. | 98/40 DL |
| 3,999,471 | 12/1976 | Bishop | 55/DIG. 29 |
| 4,012,875 | 3/1977 | Hirsch | 98/40 D |
| 4,088,463 | 5/1978 | Smith | 55/385 A |
| 4,210,429 | 7/1980 | Golstein | 55/473 |
| 4,217,121 | 8/1980 | Fichter | 55/385 A |

FOREIGN PATENT DOCUMENTS 2835104  2/1980  Fed. Rep. of Germany ........ 55/473

*Primary Examiner*—Bernard Nozick
*Attorney, Agent, or Firm*—Glenn B. Morse

[57] ABSTRACT

A filtration module having a receptacle for a filter element accessible through the outlet opening of the module has light means disposed outwardly from the receptacle with respect to the direction of air flow. The module is also preferably provided with sprinkler means including a spray head disposed outwardly from the module outlet opening.

3 Claims, 5 Drawing Figures

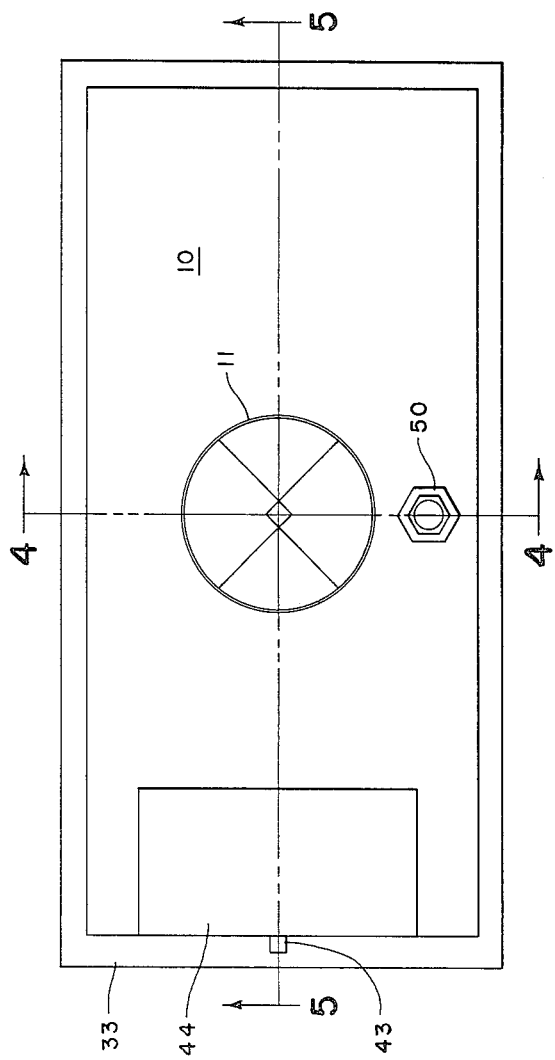
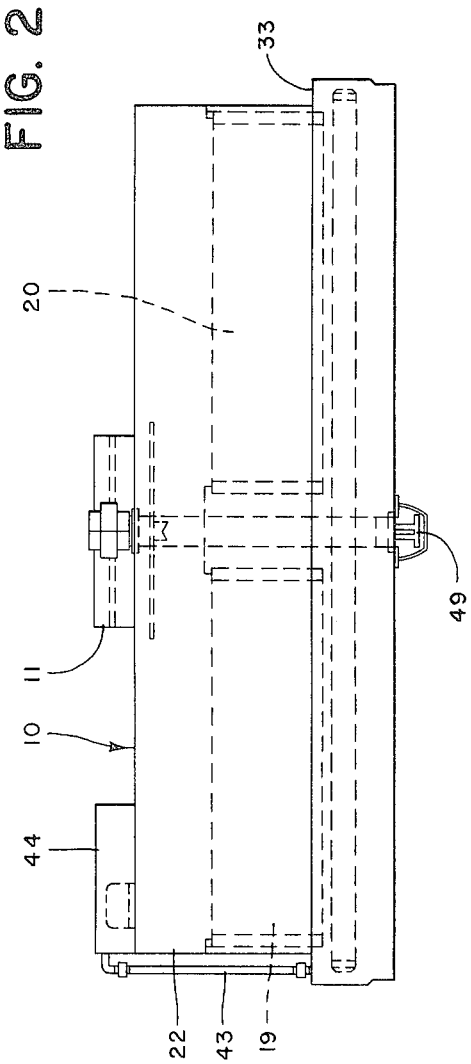
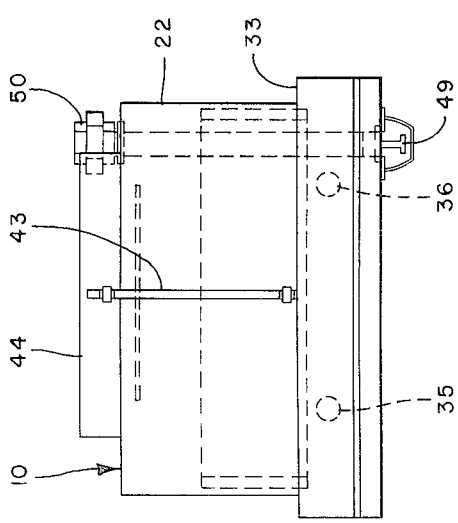

FILTRATION MODULE WITH INCLUDED ILLUMINATION

BACKGROUND OF THE INVENTION

Many forms of enclosed environment require the removal of practically all of the suspended particulate material from the air. The manufacturer of delicate instruments commonly requires such conditions, and hospitals and laboratories have similar needs. Standard replaceable filter elements have been developed to provide the necessary high degree of filtration, and these are used in conjunction with air duct systems that terminate in housings providing receptacles for the installation of these filter elements. These housings are often incorporated in the ceiling structure of work rooms, with the result that the outlet openings from the housing form a very large percentage of the area at the top of the room. The installation and replacement of the filter elements have been made possible from a position within a room by structures of the types shown in U.S. Pat. Nos. 4,088,463 and 4,217,121. It is very important that the replacement of the filter elements should disturb as little structure as possible to avoid the discharge of accumulated dust particles into the room. This obviously applies also to the installation and maintenance of electrical circuitry, including the lighting system. Existing "clean air" installations involve a complete separation of the lighting system from the filtration units, resulting in the decrease in available ceiling space for the filtration units, and a disturbance of considerable normally fixed structure in the course of possible maintenance of the entire electrical installation. Fire-control sprinkler systems are also commonly treated as entirely separate installations, having the additional effect of complicating the space requirements where the maximum filtration is desired.

SUMMARY OF THE INVENTION

This filtration module is of the type in which an outlet opening is covered by a displaceable grille defining an area through which the filter element can be inserted and removed. A space is provided between the grille and the receptacle defining the position of the filter element, and this space is utilized for the installation of a lighting system including the usual replaceable light bulbs. The components of the lighting system normally subject to periodic maintenance are also accessible from within the room in the absence of the filter element. It thus becomes unnecessary to disturb the fixed surfaces of the entire installation for normal maintenance procedures, and the entire surface devoted to the outlet openings is utilized as a light source. In the preferred form of the invention, an arrangement is also provided for the inclusion of a sprinkler system traversing the housing of the filtration module so that all three systems are, in effect, overlayed within the same surface area, and subject to a highly simplified maintenance procedure.

DESCRIPTION OF THE DRAWINGS

FIG. 1 is a top view of a filtration module incorporating the present invention.

FIG. 2 is a side view of the module shown in FIG. 1.

FIG. 3 is an end view of the module shown in FIGS. 1 and 2.

DESCRIPTION OF THE PREFERRED EMBODIMENT

Figure 4:
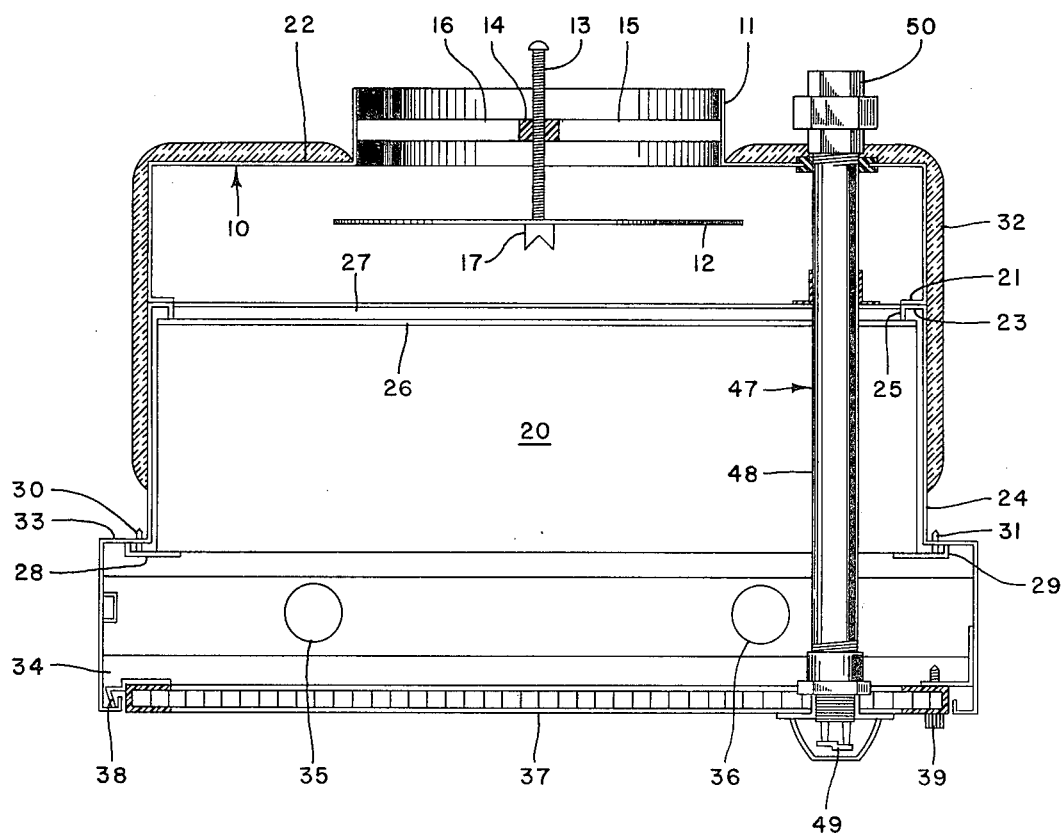
FIG. 4 is a section on the plane 4—4 of FIG. 1.

The housing generally indicated at 10 is a rectangular box-like structure having a central opening defined by the annular collar 11 which provides a point of connection to an air duct to form the inlet of the module. A conventional damper 12 is mounted on the lower end of a screw 13 in threaded engagement with the hub 14 of a bracket having arms 15 and 16 secured to the inside of the collar 11. The fitting 17 forms a receptacle for a screwdriver permitting the rotative adjustment of the screw 13 to raise and lower the damper 12, and thus control the flow of air. The upper portion of the housing defines a space indicated at 18 above the replaceable filter elements 19 and 20 for the equalization of the air flow over the surfaces through which the air must pass for the filtration.

The peripheral flange 21 forms the lower extremity of the upper section 22 of the housing, and this flange forms a junction with the flange 23 defining the upper extremity of the lower section of the housing 24. The flange 23 has a reverse bend 25 extending downward for engagement with the resilient gasket 26, which is normally integral with the standard filter element 20. This arrangement forms a very effective seal with comparatively light pressure. A channel 27 extends across the central portion of the module to seal the central sides of the filter elements 19 and 20. The lower portion of the housing 24 may thus be considered as a receptacle for these elements. Referring to FIG. 4, the elements are held with pressure against the sealing flanges by the action of clips as shown at 28 and 29 secured respectively by screws 30 and 31. The housing is preferably covered to a major extent by insulation as indicated at 32.

Figure 5:
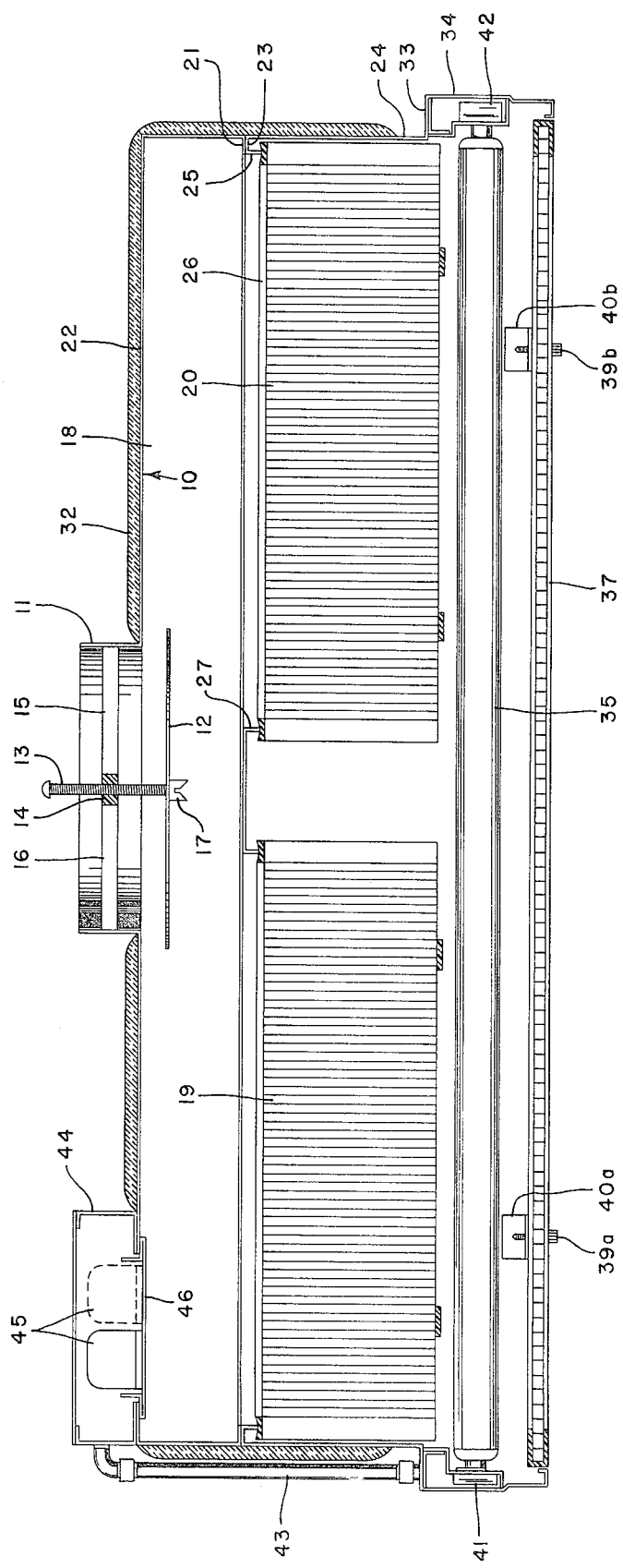
FIG. 5 is a section on the plane 5—5 of FIG. 1.

The lower portion of the housing 24 has a peripheral offset 33 and a downward extension indicated at 34. This extension provides a space for accommodating the light bulbs 35 and 36 above the displaceable grille 37, which forms the outlet of the module. The grille is normally of a translucent material, with the equivalent of a disengageable hinge connection indicated at 38 permitting the grille to be swung downward about this point upon the removal of the retaining screws 39. These screws are in threaded engagement with brackets as shown at 40 in FIG. 5, which are preferably welded to the wall of the lower section of the housing.

The peripheral offset 33 provides space for accommodating the wiring associated with the sockets as shown at 41 and 42, and the conduit 43 communicates with this space from the enclosure 44 on top of the housing, which contains the ballast units 45 for the florescent bulbs. Access to these ballast units is provided by the removeable panel 46, which can be withdrawn downwardly in the absence of the filter element 19 to expose the ballast units for replacement or other maintenance. The panel 46 will normally be secured in place either by sheet metal screws, or by a snap-in arrangement. These service operations are thus made possible from the interior of the room below the grille 37 without a necessity of disturbing the installation of the housing or the air ducting associated with it.

Referring to FIG. 4, a further feature is incorporated in the module for providing a dual use of the maximum amount of available space in the ceiling area of the room. Where fire risk renders a sprinkler system desireable, the module is provided with the sprinkler means indicated generally at 47. This includes the pipe 48 vertically traversing the module, with the sprinkler head 49 disposed below the grille 37, and outwardly from it with respect to the movement of air. The upper extremity of the pipe 48 has a standard pipe coupling 50 for interengagement with a pressurized water system. When all of these features are incorporated in the module, the entire ceiling area of a work room can be subject to the three systems that are overlaid within the same ceiling area.

We claim:

1. A filtration unit including a housing provided with an intake opening adapted for connection to a duct system, said housing also having a receptacle portion adapted to receive a filter element, a filter element removeably received in said receptacle portion said housing having an outlet opening on the opposite side of said receptacle portion from said intake opening, said unit also having disengageable means attached to said housing and adapted to releaseably secure a filter element in said receptacle portion, said means being accessible through said outlet opening, wherein the improvement comprises:

light means disposed within said outlet opening, said light means including socket means and at least one replaceable bulb normally received in said socket means and further including electrical components mounted on said housing and accessible through said outlet opening in the absence of a filter element from said receptacle portion.

2. A unit as defined in claim 1, additionally including displaceable grille means disposed across the outer extremity of said outlet opening, and sprinkler means traversing said housing, and including at least one spray head disposed outwardly from said grille means.

3. A filtration unit including a housing provided with an intake opening adapted for connection to a duct system, said housing also having a receptacle portion adapted to receive a filter element, a filter element removeably received in said receptacle portion, said housing having an outlet opening on the opposite side of said receptacle portion from said intake opening, said unit also having disengageable means attached to said housing and adapted to releaseably secure a filter element in said receptacle portion, said means being accessible through said outlet opening, wherein the improvement comprises:

sprinkler means vertically traversing said housing, and including at least one spray head disposed outwardly from said outlet opening.

* * * * *